Patented Nov. 18, 1930

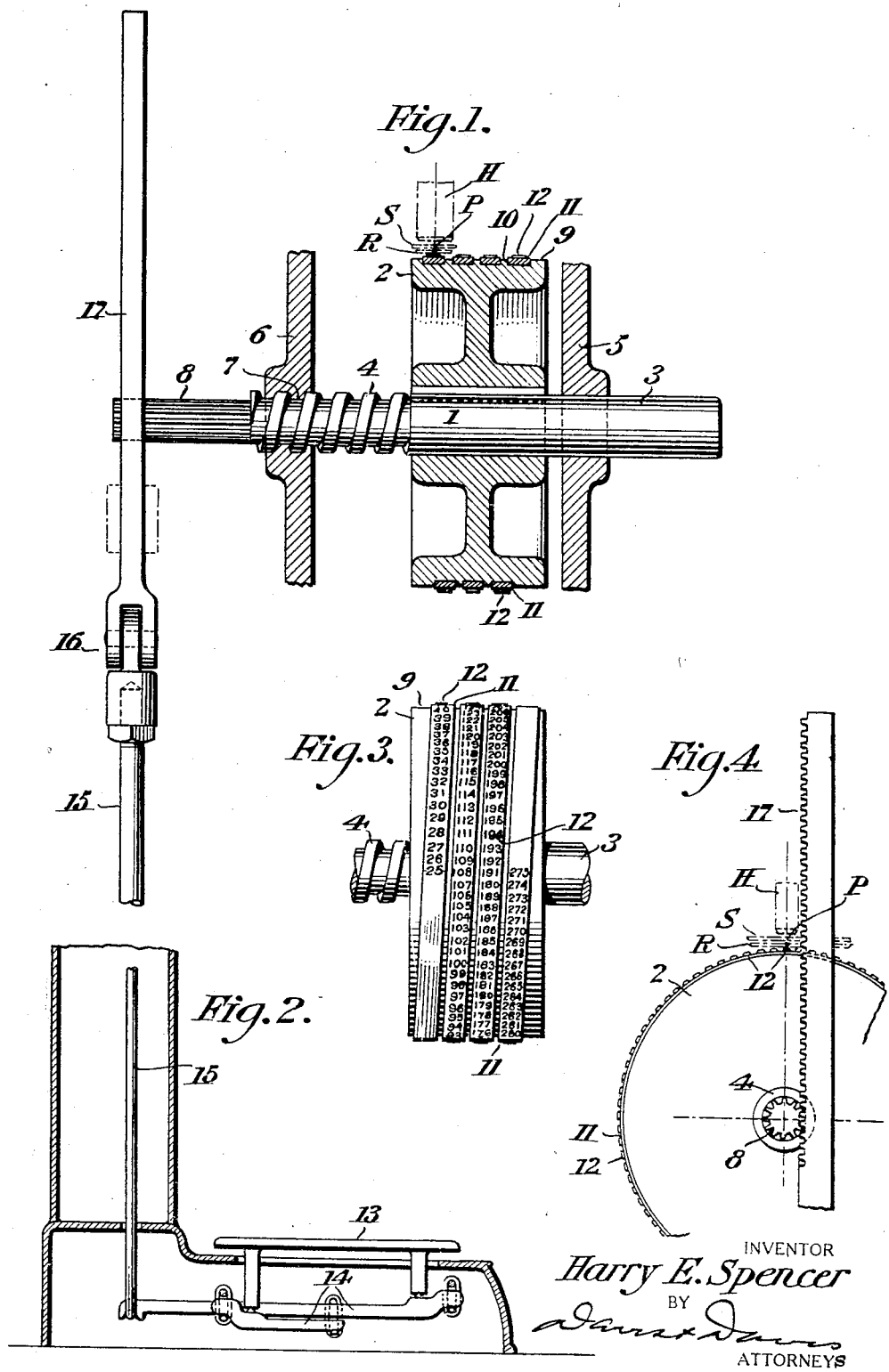

1,781,793

UNITED STATES PATENT OFFICE

HARRY E. SPENCER, OF NEW YORK, N. Y.

WEIGHT-PRINTING MECHANISM FOR SCALES

Application filed August 16, 1927. Serial No. 213,365.

This invention relates to a type of public weighing scales equipped with a printing mechanism to provide the user of the scales with a permanent record of his weight. Such scales are usually coin-controlled and after the user has stepped upon the scale platform and inserted a coin, a ticket bearing a printed indication of his weight is mechanically delivered to him. A large number of type are required for this purpose and in existing machines such type are carried by a rotor of relatively large diameter and extend in a circular row around the circumference thereof. This rotor is rotated by the scale mechanism to bring the proper type to a point where the printing is to take place. It frequently happens in the operation of the scales that the momentum of the relatively large type-bearing rotor causes it to move idly or oscillate near the end of its movement, carrying the proper type beyond the printing point and presenting a wrong type at said point for the printing operation. When this occurs a false weight number is printed and delivered to the user of the scales.

It is the main object of the present invention to provide a reliable printing mechanism which will print the correct weight in all operations of the scales.

In the drawings:

Fig. 1 is a longitudinal sectional view of the improved printing mechanism;

Fig. 2 a view upon a smaller scale of a scale platform and a portion of its operative connection with said printing mechanism;

Fig. 3 a detail plan view of the type-bearing rotor; and

Fig. 4 a diagrammatic end view of the printing mechanism.

Referring by numerals to the various parts, the printing mechanism includes a shaft 1. Mounted upon the shaft 1, and keyed or fixed in any suitable manner to rotate with it, is a rotor in the form of a wheel 2. The shaft 1 projects out beyond the opposite sides of the wheel and one of its projecting ends is in the form of an elongated journal 3. The opposite projecting end of the shaft is formed with a screw thread 4. The journal 3 is supported in a bearing 5 for rotation and axial movement. The threaded portion of the shaft is supported by a bearing 6 and the bearing opening of the latter is threaded as at 7 to engage the shaft thread 4. These two bearings are spaced apart sufficiently to allow the rotor 2 considerable endwise movement between them. Integrally formed with the threaded portion of the shaft and extending axially from the end thereof is a toothed pinion 8. This pinion is axially elongated.

The rotor 2 is formed with a cylindrical peripheral surface 9 in which is formed a helical groove 10. In the present instance this groove describes almost four complete turns or coils around the rotor axis and the pitch of the helix described thereby is equal to the pitch of the thread 4. Secured in the groove is a strip 11 which bears outstanding type 12. The latter are evenly spaced along the strip; are arranged in a row extending around three complete turns thereof, and indicate all of the numbers from "25" to "275" inclusive. These numbers are the limits of the weighing capacity of the scales.

This simple manner of mounting the type greatly facilitates and cheapens the manufacture of the device. It avoids separate mountings for the type; provides a compact arrangement of them and thereby increases the type-carrying capacity of the drum while keeping the diameter thereof at a minimum. The screw 4 and the drum groove 10 are made with the required corresponding pitch. The type are formed upon, or secured to, the strip and the strip is wound upon the drum and secured in the groove. The strip or band is preferably formed substantially straight, but it may be in any desirable form. It is unnecessary to set up the type with reference to their final helical arrangement as the helical drum groove will ensure said arrangement.

The scales with which the printing mechanism is used are provided with the usual platform 13 supported by the floating beams 14. One of these beams extends rearwardly and has an operative connection with the pinion 8 for turning the rotor 2 when the platform is depressed by a weight thereon. This operative connection includes a reach rod 15 which extends upward from the beam 14 and is hingedly connected as at 16 to the lower end of a vertically disposed toothed rack 17. The latter meshes with the elongated pinion 8 and is guided in any suitable manner for vertical movement.

In Figs. 1 and 4 of the drawings I have diagrammatically indicated a printing hammer H which is mounted to reciprocate over a fixed printing point P. A strip S of paper is disposed across the printing point, transversely of the hammer H and between the latter and the type upon the rotor. Interposed between the strip S and the type is an ink ribbon R. Therefore when one of the type is brought to the printing point and the hammer forced downward the number indicated by the type will be printed upon the underface of the strip S. The hammer H is reciprocated by mechanical means and the strip S and ribbon R are fed across the printing point by mechanical means after the operation of the hammer. These means form no part of the present invention and they have been omitted to simplify the showing.

When the scale platform 13 is depressed by a weight thereon the beams 14 are rocked downwardly and the rod 15 and rack 17 are pulled down to a degree dependent upon the weight. The descent of the rack rotates the pinion 8, the shaft 1 and the rotor 2. During this rotation these parts are axially advanced by the engagement of the thread 4 of the shaft with the bearing thread 7, and the elongated pinion slides across the rack. Since the pitch of the helix described by the type-bearing strip 12 corresponds to the pitch of the thread 4 the type numbers will be brought in succession accurately to the printing point when the rotor is rotated. The number brought to the printing point at the end of a rotative movement of the rotor indicates the weight upon the platform 13. This number is printed upon the strip S and the portion of the strip bearing said number is mechanically presented to the user of the scales.

The rotor is freely rotatable from and back to a normal position by the up-and-down movement of the scale platform. It is in its normal at-rest position when there is no weight on the platform, and in this position the lowest number on the type strip is nearest the fixed printing point. When the weight is removed from the scale platform, the platform returns to its at-rest position and through the connected mechanism the rotative and axial movements of the rotor are reversed to return the rotor to its at-rest position.

The arrangement of the type along a plurality of helical coils effects a great reduction in the necessary diameter of the rotor. In existing machines the type are arranged in a circle and require a rotor of large diameter to carry them. The momentum of this large rotor often carries the proper weight number past the printing point and brings an incorrect number into position to be printed. In the present mechanism the great reduction in the diameter of the rotor greatly reduces the momentum and tends to prevent such an error. Any final undesired rotation or oscillation of the rotor before it comes to rest is also resisted by the reaction between the threads 4 and 7 and by the friction between the pinion 8 and the rack 17. In its rotation the rotor is constrained to move axially also and the reaction faces of the teeth are disposed at an angle, transversely to the direction of rotation, and offer resistance to any idle rotation of the rotor. Consequently the correct type, when it is brought to the printing point P by the depression of the scale platform, remains at said point until the printing operation takes place.

What I claim is:

1. A weighing scales comprising a weighing platform; a rotor provided upon its periphery with a series of numbers running circumferentially around the rotor and transversely across its peripheral face; means operatively connecting the weighing platform to the rotor to turn said rotor when the weighing platform is depressed; and means for moving the rotor axially during its rotation to bring the number indicating the amount of weight on the platform to a fixed point, the means connecting the weighing platform to the rotor automatically returning the rotor to normal position when the weight is removed.

2. A weighing scales comprising a weighing platform; a rotor provided upon its periphery with a series of numbers; means operatively connecting the weighing platform to the rotor to turn said rotor when the weighing platform is depressed; and means for moving the rotor axially during it rotation to bring the number indicating the amount of weight on the platform to a fixed point, the rotor being automatically returned to normal position when the weight is removed.

3. In a weight-printing mechanism for scales, a rotor provided upon its periphery with a helical row of fixed type extending around the rotor axis; a journal extending axially from one end of the rotor; a bearing supporting said journal for rotation and axial movement; a screw rigid with the rotor and extending axially from the opposite end of the rotor, the pitch of said screw corresponding to the pitch of the type helix; a threaded, fixed bearing receiving said screw; an axially elongated pinion rigid with said screw and extending axially from the outer end thereof; and a shiftable toothed member engaging said pinion to turn the rotor and axially move it when the scales are operated, a weighing platform; connections between the said platform and the shiftable toothed member to cause said member to move in response to the movements of the weighing platform.

4. In a weight-printing mechanism for scales, a weighing platform; a drum-like rotor; a band helically wound around the periphery of said rotor, fixed thereto and provided with a row of rigid type extending therealong around the rotor; a journal extending axially from one end of the rotor; a bearing supporting said journal for rotation and axial movement; a screw rigid with the rotor and extending axially from the opposite end of the rotor; the pitch of said screw corresponding to the pitch of the type helix; a threaded, fixed bearing receiving the screw; an axially elongated pinion rigid with the screw and extending axially therefrom; a shiftable toothed member engaging said pinion to turn the rotor and axially move it; and an operative connection between the scales platform and said toothed member for shifting the latter.

5. In a weight-printing mechanism for scales, a substantially cylindrical rotor formed with a helical peripheral groove of uniform and constant pitch defining a plurality of turns around the rotor; an elongated band helically wound around said rotor seated and secured in said groove and bearing a row of outstanding type extending therealong a plurality of times around the rotor; a weighing platform; means connecting the weighing platform to the rotor to rotate the rotor when the scales are operated; and a screw disposed in axial alinement with the rotor and fixed to rotate with it for moving the rotor axially, the pitch of said screw corresponding to the pitch of the rotor groove.

6. In a printing mechanism, a substantially cylindrical rotor formed with a helical peripheral groove of uniform and constant pitch defining a plurality of turns around the rotor; an elongated band equal in width to the groove to fit therein and helically wound around said rotor seated and secured in said groove and bearing a row of outstanding integral type extending therealong a plurality of times around the rotor; means to rotate the rotor to bring an appropriate type to a stationary printing position; and a screw disposed in axial alinement with the rotor and fixed to rotate with it for moving the rotor axially to cause the type to pass the printing point during the rotation of the rotor, the pitch of said screw corresponding to the pitch of the rotor groove.

7. In combination, a weighing scale including a weighing platform adapted to be depressed by a weight placed thereon, and returned to its normal at-rest position when the weight is removed; a weight printing mechanism comprising a rotor mounted on a horizontal axis and freely rotatable from and to a normal at-rest position; a series of weight printing type fixed to the said rotor and arranged in a helical row around the periphery thereof with the lowest number of the series near the printing position in the normal at-rest position of the rotor; an operative connection between the scale platform and the rotor for rotating the latter in one direction when the platform is depressed and returning the rotor to its normal at-rest position when the platform returns to its normal position and adapted to turn the rotor different extents for different weights on the platform; and means to move the rotor axially different distances as it is rotated by different weights on the platform the axial movement of the rotor corresponding to the pitch of the helical row of type, to bring the appropriate type in said helical row to a fixed printed point while the weight remains on the platform, the rotative and axial movements of the rotor being reversed to return the rotor to its normal at-rest position when the weight is removed.

8. In combination, a weighing scale including a weighing platform adapted to be depressed by a weight placed thereon, and returned to its normal at-rest position when the weight is removed; a weight printing mechanism comprising a rotor mounted on a horizontal axis and freely rotatable from and back to a normal at-rest position; an elongated band helically wound around the periphery of said rotor, fixed thereto and bearing a series of closely arranged outstaniding weight-printing type fixed to the band and extending in a helical row of constant and uniform pitch therealong a plurality of times around the rotor with the lowest number of the series near the printing position in the normal at-rest position of the rotor; an operative connection between the scale platform and the rotor for rotating the latter in one direction when the platform is depressed and returning the rotor to its normal at-rest position when the platform returns to its normal position and adapted to turn the rotor different extents for different weights on the platform; and means to move the rotor axially different distances as it is rotated by different weights on the platform the axial movement of the rotor corresponding to the pitch of the helical row of type, to bring the appropriate type in said helical row to a fixed printing point while the weight remains on the platform, the rotative and axial movements of the rotor being reversed to return the rotor to its normal at-rest position when the weight is removed.

9. In combination, a weighing scale including a weighing platform adapted to be depressed by a weight placed thereon, and returned to its normal at-rest position when the weight is removed; a weight printing mechanism comprising a rotor mounted on a horizontal axis and freely rotatable from and back to a normal at-rest position; and formed with a helical peripheral groove defining a plurality of turns around the rotor; an elongated helical band seated and secured in said groove helically wound around the rotor and bearing a series of outstanding, integral weight-printing type extending along the band a plurality of times around the rotor with the lowest number of the series near the printing position in the normal at-rest position of the rotor; an operative connection between the scale platform and the rotor for rotating the latter, in one direction when the platform is depressed and returning the rotor to its normal position and adapted to turn the rotor different extents for different weights on the platform; and means to move the rotor axially different distances as it is rotated by different weights on the platform the axial movement of the rotor corresponding to the pitch of the helical row of type, to bring the appropriate type in said helical row to a fixed printing point while the weight remains on the platform, the rotative and axial movements of the rotor being reversed to return the rotor to its normal at-rest position when the weight is removed.

In testimony whereof I hereunto affix my signature.

HARRY E. SPENCER.